(12) United States Patent
Yau et al.

(10) Patent No.: US 10,306,717 B1
(45) Date of Patent: May 28, 2019

(54) FLICKER-FREE LED DRIVING APPARATUS AND VOLTAGE REGULATING METHOD THEREOF

(71) Applicant: ASIAN POWER DEVICES INC., Taoyuan (TW)

(72) Inventors: Yeu-Torng Yau, Taoyuan (TW); Tsung-Liang Hung, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 0 days.

(21) Appl. No.: 16/038,721

(22) Filed: Jul. 18, 2018

(30) Foreign Application Priority Data

Apr. 20, 2018 (TW) .............................. 107113614 A

(51) Int. Cl.
*H05B 33/08* (2006.01)
*G05F 1/46* (2006.01)
(Continued)

(52) U.S. Cl.
CPC ......... *H05B 33/0818* (2013.01); *G05F 1/467* (2013.01); *H02M 1/15* (2013.01);
(Continued)

(58) Field of Classification Search
CPC ................ H05B 33/08; H05B 33/0809; H05B 33/0815; H05B 33/0818; H05B 33/0851;
(Continued)

(56) References Cited

U.S. PATENT DOCUMENTS

| 8,278,832 | B2* | 10/2012 | Hung | ................. | H05B 33/0854 |
|---|---|---|---|---|---|
| | | | | | 315/219 |
| 2006/0132061 | A1* | 6/2006 | McCormick | ........ | H02M 1/4258 |
| | | | | | 315/291 |

(Continued)

FOREIGN PATENT DOCUMENTS

| CN | 201854475 U | 6/2011 |
|---|---|---|
| TW | I423732 | 5/2011 |

(Continued)

OTHER PUBLICATIONS

TIPO. Office Action. dated Nov. 26, 2018.

*Primary Examiner* — Thai Pham
(74) *Attorney, Agent, or Firm* — Muncy, Geissler, Olds & Lowe, PC

(57) ABSTRACT

A flicker-free LED driving apparatus and voltage regulating method thereof are disclosed. The apparatus includes a power conversion circuit receiving an AC electricity and then generating an output voltage with a ripple component for an LED string; a feedback circuit electrically connected to the power conversion circuit and generating a feedback signal with varying duty cycle according to operation states of the LED string; a power conversion circuit including, a controller receiving the feedback signal turns on or off a switching device thereof according to the feedback signal; and a linear voltage-regulating circuit electrically connected to the power conversion circuit, the feedback circuit, and the LED string. and configured to regulate the output voltage in (Continued)

accordance with a voltage difference between the output voltage and a voltage across the LED string.

3 Claims, 4 Drawing Sheets

(51) Int. Cl.
*H02M 1/15* (2006.01)
*H02M 1/34* (2007.01)
*H02M 1/44* (2007.01)
*H02M 7/12* (2006.01)

(52) U.S. Cl.
CPC ............... *H02M 1/34* (2013.01); *H02M 1/44* (2013.01); *H02M 7/125* (2013.01); *H05B 33/0887* (2013.01)

(58) Field of Classification Search
CPC ... H05B 33/0887; H05B 33/089; H02M 1/15; H02M 1/34; H02M 1/44
See application file for complete search history.

(56) References Cited

U.S. PATENT DOCUMENTS

| | | | | |
|---|---|---|---|---|
| 2008/0278092 | A1* | 11/2008 | Lys ..................... | H05B 33/0815 315/247 |
| 2011/0025217 | A1* | 2/2011 | Zhan .................... | H02M 3/335 315/219 |
| 2011/0285301 | A1* | 11/2011 | Kuang ............... | H05B 33/0809 315/200 R |
| 2014/0152183 | A1* | 6/2014 | Kim .................. | H05B 33/0809 315/155 |
| 2014/0300274 | A1* | 10/2014 | Acatrinei .......... | H05B 33/0815 315/85 |

FOREIGN PATENT DOCUMENTS

| | | |
|---|---|---|
| TW | 201615057 A | 4/2016 |
| TW | I642326 | 8/2018 |

* cited by examiner

FLICKER-FREE LED DRIVING APPARATUS AND VOLTAGE REGULATING METHOD THEREOF

BACKGROUND

Technical Field

The present disclosure relates to a light emitting diode (LED) driver and, more particularly, to a flicker-free LED driving apparatus.

Description of Related Art

Whilst continued improvements in the cost and reliability of light emitting diodes (LEDs) have led to the wider adoption of LED technology in the areas of indoor and outdoor lighting, challenges exist in the provision of driver electronic circuitry suitable for supplying a regulated current to LED lighting systems. It is well known that variations in the drive current supplied to an LED load can adversely affect performance.

In particular, LEDs which receive current from a power supply unit (PSU) which takes a single-phase Alternating Current (AC) input from a mains or similar supply, are sensitive to the presence of residual "voltage ripple" resulting from incomplete suppression of the AC component of the waveform emanating from a rectifier circuit that sits at or near the input of the PSU, and which AC component takes the form of a sinusoidal voltage at twice the frequency of the AC voltage from the said mains or similar supply.

LEDs, being diodes, exhibit in their operating region, low differential impedance-defined as the rate of change of voltage ($V_{LED}$) with current ($I_{LED}$). This low differential impedance leads to the generation of significant levels of ripple current in the LEDs in the presence of voltage ripple, as shown in FIG. 1.

In general, the voltage difference on both ends of the LED string has to be larger than its junction voltage value in order to emit light. If the instantaneous voltage of the pulsed DC power supply supplied to the LED string is less than the junction voltage value, the LEDs turn off, resulting in flickering on the LED string. Take pulsed DC power supply with a frequency of 120 Hz as an example. The flickering frequency is also 120 Hz.

Human eyes are not sensitive to such flickering at the frequency of 120 Hz, but for an image capture device that performs periodic scans, images captured under a light source flickering at the frequency of 120 Hz have flickering effects due to the difference between the scanning frequency and the light source frequency. The net result is that the images have a plurality of parallel stripes, leading to distortions in the photos.

SUMMARY

According to one innovation aspect of the subject matter described in this specification can be embodied in a flicker-free light emitting diode (LED) driving apparatus adapted to driving an LED string including a power conversion circuit, a feedback circuit, and a linear voltage-regulating circuit. The power conversion circuit includes an alternating current (AC) to direct current (DC) rectifier, a transformer, a switching device, a controller, and an output stage rectifier; the AC to DC rectifier is configured to convert an AC electricity into an input voltage; the transformer has a primary winding and a secondary winding, and the primary winding is electrically connected to the AC to DC rectifier; the switching device is electrically connected to the primary winding; the controller is electrically connected to the switching device and configured to vary a duty cycle of the switching device, and the output stage rectifier is electrically connected to the secondary winding and configured to generate an output voltage with ripple component to the LED string. The feedback circuit is electrically connected to the output stage rectifier and configured to generate a feedback signal to the controller in accordance with operation states of the LED string, wherein the controller uses the feedback signal as a basis for controlling the switching device. The linear voltage-regulating circuit is electrically connected to the output stage rectifier and the LED string and configured to regulated the output voltage in accordance with a voltage difference between the output voltage and a voltage across the LED string.

Another innovation aspect of the subject matter described in this specification can be embodied in a voltage regulating method including providing an output voltage with ripple component to a load; providing a feedback signal when a valley voltage exited from the load is less than a reference voltage; and regulating the level of the output voltage in accordance with the feedback signal.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
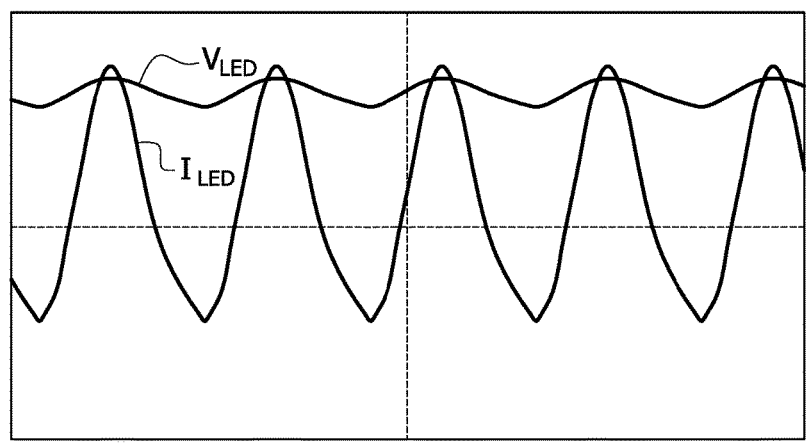
FIG. 1 is a waveform diagram of a driving voltage and a driving current generated by light emitting diode (LED) driver.
Figure 2:
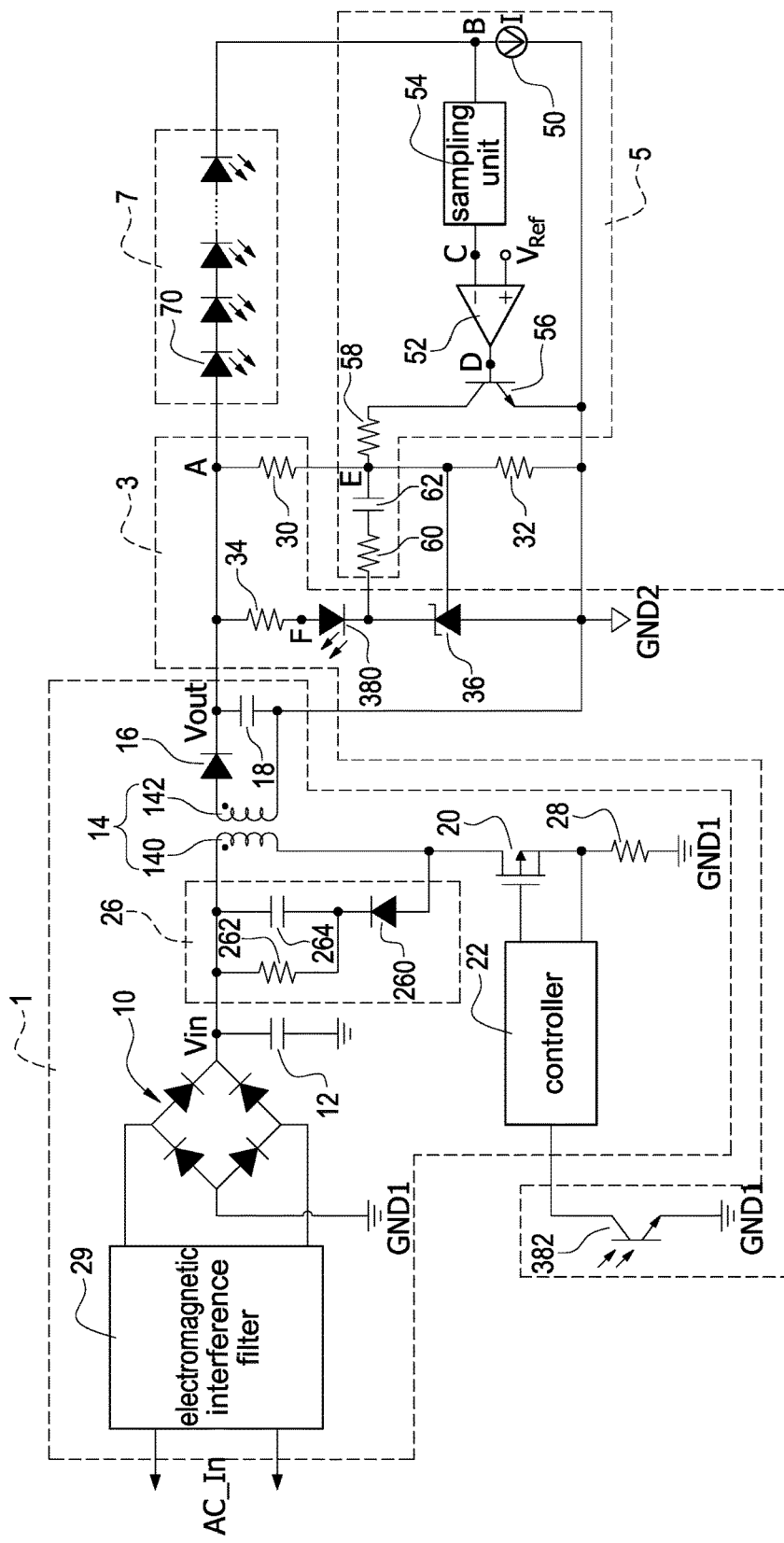
FIG. 2 is a circuit block diagram of an example of a flicker-free LED driving apparatus according to the present disclosure; and FIG. 3 to FIG. 8 shows waveforms of the corresponding nodes A-F of the flicker-free LED driving apparatus according to the present disclosure.

FIG. 2 shows an example of a flicker-free light emitting diode (LED) driving apparatus for driving an LED string 7. In FIG. 2, the flicker-free LED driving apparatus (its reference numeral is omitted) includes a power conversion circuit 1, a feedback circuit 3, and a linear voltage-regulating circuit 5, and is configured for powering the LED string 7 including a plurality of light emitting diodes (LEDs) 70 in serial connection.

The power conversion circuit 1 includes an alternating current (AC) to direct current (DC) rectifier 10, an input stage capacitor 12, a transformer 14, an output stage rectifier 16, an output stage capacitor 18, a switching device 20, and a controller 22. The AC to DC rectifier 10 is electrically connected to an AC power source AC_In; the input stage capacitor 12 is arranged between the AC to DC rectifier 10 and transformer 14 and electrically connected thereto. The AC to DC rectifier 10 and the input stage capacitor 12 collectively convert the AC electricity supplied by the AC power source AC_In into a DC electricity having a DC voltage Vin. The AC power source AC_In may be a commercial AC line power for providing the AC electricity, and the AC to DC rectifier 10 is, for example, a bridge rectifier of the full bridge rectifier and configured to convert the AC electricity supplied by the AC power source AC_In into a full-wave rectified electricity (with high-frequency ripple component). The full-wave rectified electricity can be filtered by, for example, the input stage capacitor 12 to smooth the DC input voltage Vin; in the other words, the input stage capacitor 12 is used for filtering the high-frequency ripple component of the full-wave rectified electricity outputted from the AC to DC rectifier 10 and outputs a stable DC input voltage Vin.

The transformer 14 is an isolated transformer and includes a primary winding 140 and a secondary winding 142 magnetically coupled to the primary winding 140. The primary winding 140 is arranged at one side of the power conversion circuit 1 where the AC power source AC_In is arranged (i.e., the input stage) for receiving the input voltage Vin, while the secondary winding 142 is arranged at the other side of the power conversion circuit 1 wherein the LED string 7 is arranged (i.e., the output stage). The input voltage Vin at the input stage is transferred to the output stage by the primary winding 140 and the secondary winding 142.

The output stage rectifier 16 is electrically connected to the secondary winding 142 and used for rectifying the voltage transferred to the output stage to generate a (pulsating DC) output voltage Vout. In the exemplary embodiment shown in FIG. 2, the output stage rectifier 16 is illustrated as a diode. The output stage capacitor 18 is electrically connected to the output stage rectifier 16 and used for reducing ripple component (i.e., the ripple voltage magnitude) of the (pulsating DC) output voltage Vout.

The switching device 20 is electrically connected to one terminal of the primary winding 140 where the AC to DC converter 10 and the input stage capacitor 12 are not connected for receiving the input voltage Vin. The controller 22 is configured to generate a controlling signal for controlling the relative amount of time that the switching device 20 is on (i.e., the duty cycle). In the exemplary embodiment shown in FIG. 2, the switching device 20 is illustrated as an n-channel metal oxide semiconductor field effect transistor (MOSFET).

The power conversion circuit 1 may further includes a snubber unit 26 used to suppress the voltage stress on the switching device 20 by means of absorbing voltage spikes resulting from the leakage inductance of the transformer 14. Specifically, the snubber unit 26 includes a diode 260, a resistor 262, and a capacitor 264; the drain of the switching device 20 is connected back to the AC to DC rectifier 10 through the diode 260 and the resistor 262 to protect the switching device 20 from excessive voltages and provide a current circulation path when the switching device 20 is not conducting. The capacitor 264 is electrically connected to the resistor 262 in parallel. The source of the switching device 20 is electrically connected to an input stage circuit ground GND1 through a current-sensing resistor 28 used to feed a sensing voltage back to the controller 22.

The power converter 1 may still further includes an electromagnetic interference filter 29 arranged between the AC power source AC_In and the AC to DC rectifier 10 and electrically connected thereto. The electromagnetic interference filter 29 is configured to filter the electromagnetic noise within the AC electricity supplied by the AC power source AC_In.

The feedback circuit 3 is configured to generate a feedback signal in relation to the LED string 7, the feedback circuit 3 feed the feedback signal back to the controller 22 for varying the duty cycle of the switching device 20. In FIG. 2, the feedback circuit 3 includes a first voltage dividing resistor 30, a second voltage dividing resistor 32, a current limiting resistor 34, a voltage regulator 36, and an optocoupler (its reference numeral is omitted). One terminal of the first voltage dividing resistor 30 is electrically connected to the cathode of the diode to implement the output stage rectifier 16 and (the power input terminal of) the LED string 7. One terminal of the second voltage dividing resistor 32 is electrically connected to the other terminal of the first voltage dividing resistor 30, and the other terminal of the second voltage dividing resistor 32 is electrically connected to an output stage circuit ground GND2 (i.e., the first and the second voltage dividing resistor 30, 32 are electrically connected in series). One terminal of the current limiting resistor 34 is electrically connected to the cathode of the diode to implement the output stage rectifier 16, and the other terminal thereof is electrically connected to a node F. In the exemplary embodiment shown in FIG. 2, the voltage regulator 36 is illustrated as a TL431 regulator. The TL431 regulator is a common three-terminal integration circuit that includes an internal reference voltage. When an external voltage applied to a reference terminal (electrically connected to a node E between the first and second voltage dividing resistor 30, 32) exceeds the reference voltage, the TL431 conducts current at its two other terminals electrically connected to a light emitter 380 of the optocoupler and the output stage circuit ground GND2, respectively. The light emitter 380 is, for example, an LED; the anode of the light emitter 280 is electrically connected to the node F, and the cathode thereof is electrically connected to the voltage regulator 36.

The light emitter 380 of the optocoupler is coordinated with the operation of the voltage regulator 36 and generates the feedback signal associated with the operation condition of the LED string 7 on the light receiver 382 based on the output voltage Vout and provides the feedback signal to the controller 22, such that the controller 22 uses the feedback signal as a basis for controlling the switching device 20. In the exemplary embodiment shown in FIG. 2, the light receiver 382 is illustrated as a phototransistor.

The linear voltage-regulating circuit 5 is electrically connected to the power conversion circuit 1, the feedback circuit 3, and the LED string 7 and configured to (linearly) regulate the voltage for conducting to (a power input terminal of) the LED string 7 (i.e., the voltage on a node A) based on the voltage on a node B (i.e., a power output terminal of the LED string 7).

In FIG. 2, the linear voltage-regulating circuit 5 includes a current source 50, an operational amplifier 52, a sampling unit 54, a transistor 56, a first resistor 58, a second resistor 60, and a capacitor 62. The current source 50 is arranged between the power outputting terminal of the LED string 7 (connected to the node B) and the output stage circuit ground GND2 and electrically connected thereto. The inverting input (−) of the operational amplifier 54 (connected to a node C) is electrically connected to the current source 50 and the node B connected to the LED string 7 through the sampling unit 54; specifically, an input the sampling unit 54 is electrically connected to the node B, and an output thereof is electrically connected to the inverting input (−) of the operational amplifier 54. The non-inverting input (+) of the operational amplifier 54 receives a reference voltage Vref, and the output thereof (connected to a node D) is electrically connected to the controlling terminal of the transistor 56 (i.e., the base). The current inputting terminal of the transistor 56 (i.e., the collector) is electrically connected to the node E through the first resistor 58; in the other words, one terminal of the first resistor 58 is connected to the collector of the transistor 56 and the other terminal of the first resistor 58 is connected to the node E. The current outputting terminal of the transistor (i.e., the emitter) is electrically connected to output stage circuit ground GND2. The second resistor 60 is electrically connected to the capacitor 62 in series; in detail, one terminal of the capacitor 62 is connected to one terminal of the second resistor 60, the other terminal of the capacitor 62 where the second resistor 60 is connected is electrically connected to the node E, and the other terminal of the second resistor 60 where the capacitor 62 is not connected is electrically connected to the cathode of the LED to implement the light emitter 380.

In general, when the flicker-free LED driving apparatus operates normally, the controller 22 generates the controlling signal in response to a power supply demand of the LED string 7, so as to control the operation of the power conversion circuit 1. Under this condition, when the switching device 20 is turned on in response to the (pulse width modulation (PWM)) controlling signal generated by the controller 22, the input voltage Vin bridges over the primary winding 140 on the input stage and causes an inductive current of the primary winding 140 to increase linearly to store energy. In the meantime, the diode to implement the output stage rectifier 16 turns off. Due to the blocking of the turned off diode to implement the output stage rectifier 16, no current passes through the secondary winding 142 on the output stage.

Figure 3:
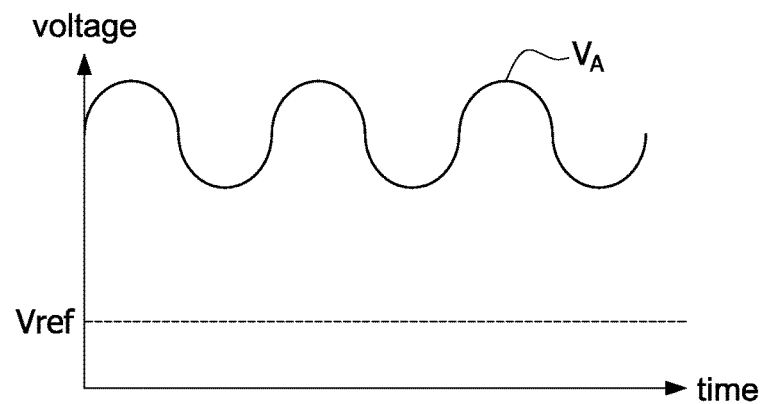

When the switching device 20 is turned off in response to the (PWM) controlling signal generated by the controller 22, based on the Lenz's law, the energy stored by the primary winding 140 is transferred to the secondary winding 142. In the meantime, the diode to implement the output stage rectifier 16 turns on; the energy transferred to the secondary winding 142 charges the output stage capacitor 18 and supplied the output voltage Vout to the LED string 7. Referring to FIG. 3, which shows a waveform of the node A voltage responding to the reference voltage Vref in the flicker-free LED driving apparatus. Due to the output voltage Vout provided by the power conversion circuit 1 has a ripple component, the voltage on node A is also the voltage having the ripple component. In general, the LEDs 70 is characterized by the voltage that must be applied to the (forward) junction voltages (or called the forward biases) so that a current will flow through the LEDs 70; in the other words, the LED string 7 is lighted up when the voltage drops on the LEDs 70 is equal to or greater than the forward biases of the LEDs 70. On the contrary, the LEDs 70 will put out while the instantaneously voltage on the node A is smaller than the forward biases of the LEDs 70. In detail, during the positive half of the ripple cycle, the voltage on the node A is higher than the forward biases of the LEDs 70, and the LEDs are on; during the negative half of the ripple cycle, the voltage on the node A will be less than the forward biases, and the LEDs are off, so that the LED string 7 will have an obviously flicker that affects the lighting quality. It is desirable to have the stable voltage on node A which suppresses the observed flicker when the LED string 7 is turned on.

In the present disclosure, the first voltage dividing resistor 30, the second voltage dividing resistor 32, and the first resistor 58 divide the output voltage Vout to generate the voltage on the node A for supplying to the LED string 7. When the voltage at node A is $V_A$, the resistance of the first voltage dividing resistor is $R_{up}$, the resistance of the second voltage dividing resistor is $R_{dn1}$, the resistance of the first resistor 58 is $R_{dns}$, and the following condition is satisfied:

$$V_A = Vout \times \frac{R_{up} + R_{dn1} // R_{dn2}}{R_{dn1} // R_{dn2}}.$$

Figure 4:
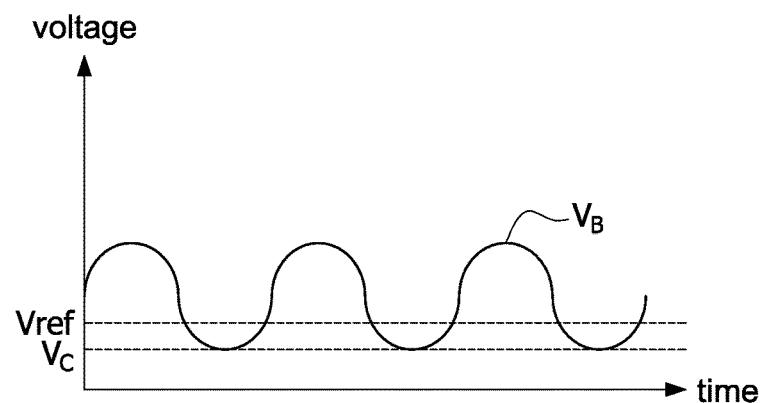

Referring to FIG. 4, the waveform of the voltage on the node B (referring to "$V_B$" in FIG. 4) is similar to that of the voltage on the node A (referring to "$V_A$" in FIG. 3), but duffers in that the magnitudes of the voltages. In detail, when the voltage on the node A is $V_A$, the voltage on the node B is $V_B$, a conduction voltage (approximately equal to the forward biases of the LEDs 70 mentioned above) of the LED string 7 is $V_{LED}$, and the following condition is satisfied:

$$V_A - V_{LED} = V_B.$$

On the basis of the above, then voltage on the node A is dropped, the voltage on the node B correspondingly falls, so that the voltage on the node A is determined by monitoring the voltage on the node B. The linear voltage-regulating circuit 5 of the present disclosure uses the voltage on the node B as a basis for regulating the voltage on the node A.

Specifically, a valley voltage on the node B (referring to "$V_C$" in FIG. 4) is sampled by the sampling unit 32, and the sampled result is transmitted to the inverting input (−) of the operation amplifier 52.

Figure 5:
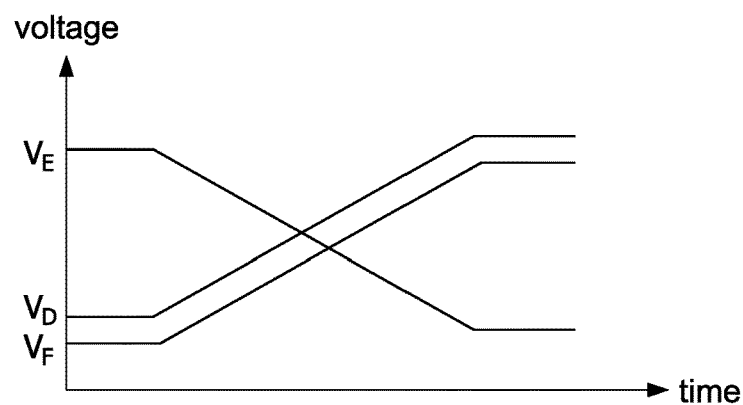

The operational amplifier 52 is configured to compare the reference voltage Vref with the valley voltage on the node B to generate a logic high signal to increase the voltage on the node D (referring to "$V_D$" shown in FIG. 5) for lowering the conduction resistance of the transistor 56 when the valley voltage on the node B is less than the reference voltage Vref, so as to decrease the voltage on the node E (referring to "$V_E$" shown in FIG. 5). When the voltage of the node E is increased, the voltage on the node F (referring to "$V_F$" shown in FIG. 5) increases for changing the brightness level of the light emitter 380, so that the feedback signal provided by the light receiver 382 and to the controller 22 is adjected to vary the duty cycle of the (PWM) controlling signal transmitted to the switching device 20 (such as increase the relative amount of time that the switching device 20 is on). Therefore, the voltage on the node A is (gradually or linearly) increased.

Figure 6:
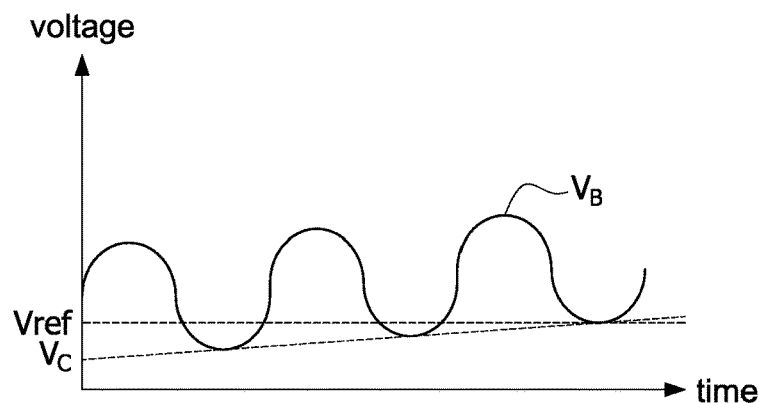
Figure 7:
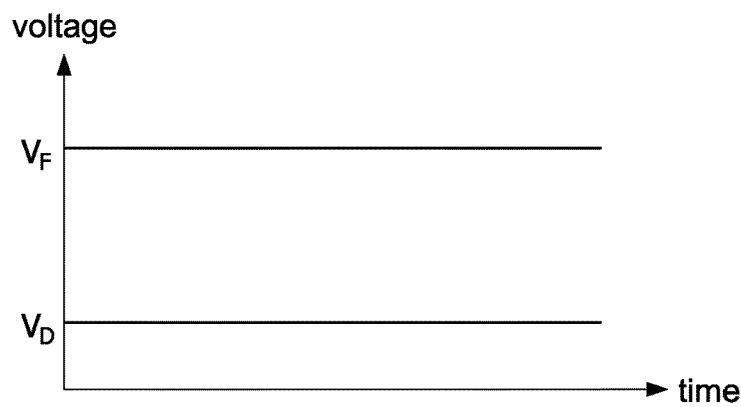
Figure 8:
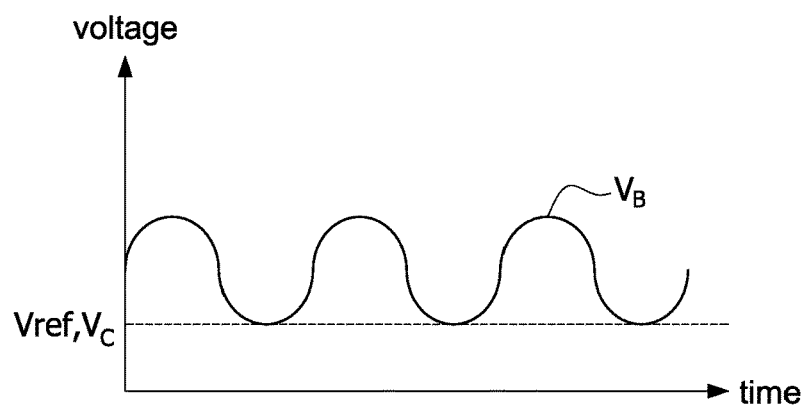

Referring to FIG. 6, the voltages on the nodes B and C are increased when the voltage on the node A increases. The operational amplifier 52 of the linear voltage-regulating circuit 5 configured to compare the reference voltage Vref with the valley voltage on the node B generates a logic low signal to maintain the voltage on the node D in a preset level for maintaining the conduction resistance of the transistor 56 when the valley voltage on the node B is not less than the reference voltage Vref (as shown in FIG. 7), so as to retain the voltage on the node F in another preset level for fixing the brightness level of the light emitter 380, so that the feedback signal provided by the light receiver 382 and to the controller 22 is fixed, and then the switching device 20 is operating with a fixed duty cycle provided by the controller 22 to stabilizing the voltage on the node A, and make sure the valley voltage on the node B is not less than the reference voltage Vref, as shown in FIG. 8, to achieve flicker suppression.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A flicker-free light emitting diode LED driving apparatus adapted to driving an LED string, the flicker-free LED driving apparatus comprising:

a power conversion circuit, comprising:
- an alternating current (AC) to direct current (DC) rectifier configured to convert an AC electricity into an input voltage;
- a transformer having a primary winding and a secondary winding, wherein the primary winding is electrically connected to the AC to DC rectifier;
- a switching device electrically connected to the primary winding;
- a controller electrically connected to the switching device and configured to vary a duty cycle of the switching device; and
- an output stage rectifier electrically connected to the secondary winding and configured to generate an output voltage with ripple component to the LED string;

a feedback circuit electrically connected to the output stage rectifier and configured to generate a feedback signal to the controller in accordance with operation states of the LED string, wherein the controller uses the feedback signal as a basis for controlling the switching device; and a linear voltage-regulating circuit electrically connected to the output stage rectifier and the LED string and configured to regulate the output voltage in accordance with a voltage difference between the output voltage and a voltage across the LED string, wherein the linear voltage-regulating circuit comprises:
- a transistor;
- a capacitor;
- a first resistor arranged between the capacitor and a current outputting terminal of the transistor and electrically connected to the capacitor and the current outputting terminal;
- a second resistor electrically connected to the capacitor and the feedback circuit;
- a current source electrically connected to the LED string;
- a sampling unit electrically connected to the LED string and the current source and configured to generate a sampling signal in accordance with the voltage difference; and
- an operational amplifier configured to compare the sampling signal with a reference voltage and generate a signal for lowering a conduction resistance of the transistor to adjust the feedback signal during the sampling signal is less than the reference voltage.

2. The flicker-free LED driving apparatus of claim 1, wherein the operation amplifier is configured to provide another signal for maintaining the conduction resistance of the transistor during the sampling signal is equal to the reference voltage.

3. The flicker-free LED driving apparatus of claim 1, wherein the feedback circuit comprises:
- an optocoupler comprising:
  - a light emitter; and
  - a light receiver using a brightness level of the light emitter as a basis for providing the feedback signal;
- a current limiting resistor arranged between the output stage rectifier and the light emitter and electrically connected to the output stage rectifier and the light emitter;
- a voltage regulator electrically connected to the light emitter and a circuit ground;
- a first voltage dividing resistor arranged between the output stage rectifier and a reference terminal of the voltage regulator and electrically connected to the output stage rectifier and the reference terminal; and
- a second voltage divided resistor electrically connected to the first voltage dividing resistor in series, wherein when the sampling signal is less than the reference voltage, the brightness level of the light emitter is changed for varying the duty cycle of the switching device.

* * * * *